(12) United States Patent
Ghantasala et al.

(10) Patent No.: US 11,585,709 B2
(45) Date of Patent: Feb. 21, 2023

(54) ENGINE TORQUE MEASUREMENT FOR VEHICLE DRIVETRAIN CONTROL

(71) Applicant: The Board of Trustees of Western Michigan University, Kalamazoo, MI (US)

(72) Inventors: Muralidhar Ghantasala, Portage, MI (US); John Bair, Plainwell, MI (US); Vivek Sri Charan Iddum, Kalamazoo, MI (US)

(73) Assignee: The Board of Trustees of Western Michigan University, Kalamazoo, MI (US)

( * ) Notice: Subject to any disclaimer, the term of this patent is extended or adjusted under 35 U.S.C. 154(b) by 95 days.

(21) Appl. No.: 16/807,553

(22) Filed: Mar. 3, 2020

(65) Prior Publication Data
US 2020/0200630 A1 Jun. 25, 2020

Related U.S. Application Data

(63) Continuation of application No. PCT/IB2018/057617, filed on Oct. 1, 2018.
(60) Provisional application No. 62/568,031, filed on Oct. 4, 2017.

(51) Int. Cl.
*G01L 5/26* (2006.01)
(52) U.S. Cl.
CPC ..................................... *G01L 5/26* (2013.01)
(58) Field of Classification Search
CPC .. G01M 15/04; G01L 5/12; G01L 5/26; G01P 3/46; G01P 3/465; G01P 3/44
See application file for complete search history.

(56) References Cited

U.S. PATENT DOCUMENTS

| | | | | | |
|---|---|---|---|---|---|
| 4,483,184 | A | * | 11/1984 | Kunzfeld | G01M 15/046 73/114.28 |
| 4,550,595 | A | * | 11/1985 | Venema | G01M 15/046 73/114.15 |
| 4,665,773 | A | * | 5/1987 | Hiramatsu | B60W 10/107 477/50 |
| 4,843,870 | A | * | 7/1989 | Citron | F02D 41/1498 73/114.15 |
| 5,056,360 | A | * | 10/1991 | Dosdall | G01P 15/165 73/114.24 |
| 5,200,899 | A | * | 4/1993 | Ribbens | G01M 15/11 324/379 |
| 5,239,473 | A | * | 8/1993 | Ribbens | G01M 15/11 123/436 |
| 5,241,480 | A | * | 8/1993 | Takaku | F02D 41/1497 701/111 |

(Continued)

FOREIGN PATENT DOCUMENTS

| | | |
|---|---|---|
| RU | 2265809 | 8/2005 |
| WO | 2019069211 | 4/2019 |

OTHER PUBLICATIONS

Li et al., "Transmission Virtual Torque Sensor—Absolute Torque Estimation," SAE International, published Apr. 16, 2012 (6 pages).

*Primary Examiner* — Tran M. Tran
(74) *Attorney, Agent, or Firm* — Price Heneveld LLP (57) ABSTRACT

A sensing system and method utilizes measured flywheel speed variations to determine engine torque. The measured engine torque can be used to control vehicle transmissions, clutches, and other vehicle components and systems.

20 Claims, 6 Drawing Sheets

(56) References Cited

U.S. PATENT DOCUMENTS

| | | | | |
|---|---|---|---|---|
| 5,278,760 A * | 1/1994 | Ribbens | F02D 41/1498 | 123/436 |
| 5,347,857 A * | 9/1994 | Mirhakimi | G01M 15/046 | 73/115.01 |
| 5,359,519 A * | 10/1994 | Jehanno | G01M 15/11 | 123/305 |
| 5,385,129 A * | 1/1995 | Eyberg | F02D 41/0085 | 123/436 |
| 5,390,545 A * | 2/1995 | Doan | G01H 1/10 | 324/166 |
| 5,446,664 A * | 8/1995 | Vossen | F02D 41/045 | 701/101 |
| 5,481,909 A * | 1/1996 | Deutsch | G01M 15/046 | 123/436 |
| 5,487,008 A * | 1/1996 | Ribbens | F02D 41/1498 | 701/102 |
| 5,495,415 A * | 2/1996 | Ribbens | G01M 15/11 | 123/436 |
| 5,496,227 A * | 3/1996 | Minowa | B60W 30/1819 | 477/110 |
| 5,508,927 A * | 4/1996 | Remboski, Jr. | G01M 15/11 | 701/101 |
| 5,576,963 A * | 11/1996 | Ribbens | G01M 15/11 | 123/436 |
| 5,596,153 A * | 1/1997 | Bulgrien | F16F 15/123 | 73/862.326 |
| 5,717,133 A * | 2/1998 | Wu | G01M 15/11 | 123/436 |
| 5,747,681 A * | 5/1998 | Kuroda | G01M 15/11 | 73/114.04 |
| 5,757,676 A * | 5/1998 | Hobelsberger | G01P 3/489 | 324/160 |
| 5,771,482 A | 6/1998 | Rizzoni | | |
| 5,771,483 A * | 6/1998 | Moine | G01M 15/11 | 123/436 |
| 5,821,411 A * | 10/1998 | Lohmann | G01M 15/11 | 73/114.04 |
| 5,856,922 A * | 1/1999 | Jehanno | G01L 3/00 | 701/108 |
| 6,021,758 A * | 2/2000 | Carey | F02D 41/0085 | 123/406.24 |
| 6,052,638 A * | 4/2000 | Genise | B60W 10/06 | 701/87 |
| 6,070,567 A * | 6/2000 | Kakizaki | F02D 41/1498 | 123/436 |
| 6,128,959 A | 10/2000 | McGovern et al. | | |
| 6,357,287 B1 * | 3/2002 | Jin | G01M 15/11 | 73/114.05 |
| 6,363,318 B1 * | 3/2002 | Wang | F02D 41/0097 | 123/352 |
| 6,389,363 B1 | 5/2002 | Marcheguet et al. | | |
| 6,729,186 B1 | 5/2004 | Sirrine et al. | | |
| 6,745,621 B1 * | 6/2004 | Le Roux Cilliers | G01L 3/109 | 73/114.26 |
| 7,010,990 B2 * | 3/2006 | Umeno | G01L 5/164 | 73/862.326 |
| 7,108,117 B2 * | 9/2006 | Genise | B60W 10/11 | 188/185 |
| 7,235,033 B2 * | 6/2007 | Eriksson | B60W 10/11 | 477/107 |
| 7,324,888 B1 * | 1/2008 | Stotsky | F02D 41/0097 | 701/101 |
| 7,530,261 B2 * | 5/2009 | Walters | G01M 15/11 | 73/114.04 |
| 7,536,250 B2 * | 5/2009 | Eisenkolbl | F02D 41/266 | 123/476 |
| 7,536,902 B2 * | 5/2009 | Tsukamoto | G01M 15/11 | 73/114.04 |
| 7,742,882 B2 * | 6/2010 | Fredriksson | F02D 41/1497 | 702/41 |
| 7,958,779 B2 * | 6/2011 | Nagano | F02D 41/0097 | 73/114.25 |
| 8,091,410 B2 * | 1/2012 | Malaczynski | F02D 41/1498 | 73/114.04 |
| 8,371,157 B2 * | 2/2013 | Bowling | G01M 15/06 | 73/114.26 |
| 8,688,358 B2 * | 4/2014 | Sano | F02D 35/023 | 701/111 |
| 8,793,002 B2 * | 7/2014 | Anderson | F02D 41/021 | 700/28 |
| 9,200,981 B2 * | 12/2015 | Horlbeck | G01M 15/11 | |
| 9,267,480 B1 * | 2/2016 | Luyks | H02K 23/52 | |
| 9,334,799 B2 * | 5/2016 | Chauvin | F02P 5/152 | |
| 9,815,473 B2 * | 11/2017 | Fujii | B60W 10/06 | |
| 9,845,752 B2 * | 12/2017 | Verdejo | F02D 41/009 | |
| 9,903,290 B2 * | 2/2018 | Hagari | F02P 5/145 | |
| 10,138,838 B2 * | 11/2018 | Ogawa | F02D 41/0097 | |
| 10,215,111 B2 * | 2/2019 | Hagari | F02D 41/26 | |
| 10,378,468 B2 * | 8/2019 | Minatoya | G01M 15/11 | |
| 10,566,919 B2 * | 2/2020 | Huang | H02P 6/08 | |
| 10,954,877 B2 * | 3/2021 | Nagashima | B60W 10/06 | |
| 11,099,102 B2 * | 8/2021 | Muto | G06N 3/0481 | |
| 2003/0089338 A1 * | 5/2003 | Remele | F02D 41/1498 | 123/436 |
| 2008/0011103 A1 | 1/2008 | Fruhwirth et al. | | |
| 2008/0243329 A1 * | 10/2008 | Hamel | B62D 5/0472 | 701/31.4 |
| 2008/0282811 A1 * | 11/2008 | Hill | G01P 3/488 | 73/862.333 |
| 2020/0333201 A1 * | 10/2020 | Vadamalu | G01L 3/02 | |

\* cited by examiner

ENGINE TORQUE MEASUREMENT FOR VEHICLE DRIVETRAIN CONTROL

CROSS-REFERENCE TO RELATED APPLICATION

This application is a Continuation of International Application No. PCT/IB2018/057617, filed on Oct. 1, 2018, which claims priority under 35 U.S.C. § 119(e) to U.S. Provisional Patent Application No. 62/568,031 filed on Oct. 4, 2017, entitled "TORQUE SENSOR FOR ENGINES," the entire disclosures of which are hereby incorporated herein by reference.

FIELD OF THE INVENTION

The present invention is generally directed to engine torque sensing, and more particularly to a sensor that determines engine torque based on flywheel acceleration.

BACKGROUND OF THE INVENTION

Various "on board" devices for measuring engine torque during vehicle operation have been developed. For example, U.S. Pat. Nos. 6,128,959 and 6,729,186 generally disclose methods of measuring speed variation of a drive line to define dynamic torsional displacement, velocity, or acceleration. U.S. Pat. No. 7,559,259 generally discloses a method of determining torque transmitted in a drivetrain of a motor vehicle. However, known engine torque measurement arrangements may suffer from various drawbacks.

BRIEF SUMMARY OF THE INVENTION

The present disclosure involves sensing/determining engine torque at the flywheel using an amplitude of an instantaneous speed variation of the flywheel at the engine's firing frequency as a basis for measurement/determination of engine torque.

The measured torque may be used by an automatic transmission, automated clutch and other vehicle components to control shifts, actuations, and other vehicle operational functions. The improved torque measurement accuracy may provide improved shifts and actuations, resulting in better vehicle performance and higher driver satisfaction.

One aspect of the present disclosure is a system for measuring engine torque. The system includes a sensor that is configured to detect gear teeth of a flywheel moving past the sensor. The sensor provides an output signal having a sequence of amplitude peaks which occur simultaneous to the tips of the gears passing the sensor. The system includes a computational device that may be configured to determine N discrete sequential flywheel speeds by dividing an angular distance between adjacent teeth by the measured times between teeth passing the sensor. The computational device is also configured to determine an average flywheel angular velocity w for the N discrete flywheel speeds. The computational device then determines a speed variation array by determining a difference between each discrete flywheel speed and the average flywheel speed w. The computational device then determines a sine array by multiplying each value of the speed variation array by sine $(2F\pi n/N)$, wherein n corresponds to a sequential number of each value of the speed variation array, and F is the number of cylinder firings per crank shaft revolution, and also determines an average of the values of the sine array. The computational device determines a cosine array by multiplying each value of the speed variation array by cosine $(2F\pi n/N)$. The computational device then determines an average of the values of the cosine array, and determines an amplitude of an angular acceleration of the flywheel. The computational device may be configured to repeat these steps to determine a plurality of angular accelerations of the flywheel. An amplitude of the angular acceleration may be determined by multiplying the $\sqrt{}$ of the sum of the squares of the sine array and the cosine array by $2F\omega$. The computational device may repeat the steps utilized to determine an amplitude of an angular acceleration of the flywheel for one or more higher harmonics 2F, 3F, 4F, etc. of the firing frequency to provide increased accuracy.

Another aspect of the present disclosure is a method for measuring engine torque. A sensor is utilized to detect gear teeth of a flywheel moving past the sensor, the sensor providing an output signal having a plurality of pukes comprising amplitude peaks and puke times between adjacent amplitude peaks. The method includes determining N discrete flywheel speeds by dividing an angular distance between adjacent teeth by the puke times. The method further includes determining an average flywheel speed w for the N discrete flywheel speeds, and determining a speed variation array by determining a difference between each discrete flywheel speed and the average flywheel speed w. A sine array is determined by multiplying each value of the speed variation array by sine $(2F\pi n/N)$, wherein n corresponds to a sequential number of each value of the speed variation array, and F is the number of cylinder firings per crank shaft revolution. The method further includes determining an average of the values of the sine array. A cosine array is determined by multiplying each value of the speed variation array by cosine $(2F\pi n/N)$. The method further includes determining an average of the values of the cosine array, and determining an amplitude of an angular acceleration of the flywheel. These steps may be repeated to determine a plurality of angular accelerations of the flywheel. The amplitude of an angular acceleration may be determined by multiplying the $\sqrt{}$ of the sum of the squares of the sine array and the cosine array by $2F\omega$. The steps of the method may be duplicated for one or more higher harmonics 2F, 3F, etc. of the firing frequency to provide increased accuracy.

Another aspect of the present disclosure is a method of measuring engine torque. The method includes utilizing a sensor to generate measured pulses corresponding to individual gear teeth of a flywheel moving past the sensor. Output from the sensor is utilized to determine pulse times between measured pulses corresponding to adjacent gear teeth. The method further includes determining a plurality of individual angular speeds by dividing angles between selected gear teeth by pulse times corresponding to the selected gear teeth. An average flywheel speed omega is determined, and differences between the average flywheel speed omega and the individual speeds between gear teeth are utilized to determine an angular acceleration of a flywheel. An engine torque on the flywheel is determined by utilizing the angular acceleration of the flywheel.

These and other features, advantages, and objects of the present disclosure will be further understood and appreciated by those skilled in the art by reference to the following specification, claims, and appended drawings.

DETAILED DESCRIPTION

Figure 1:
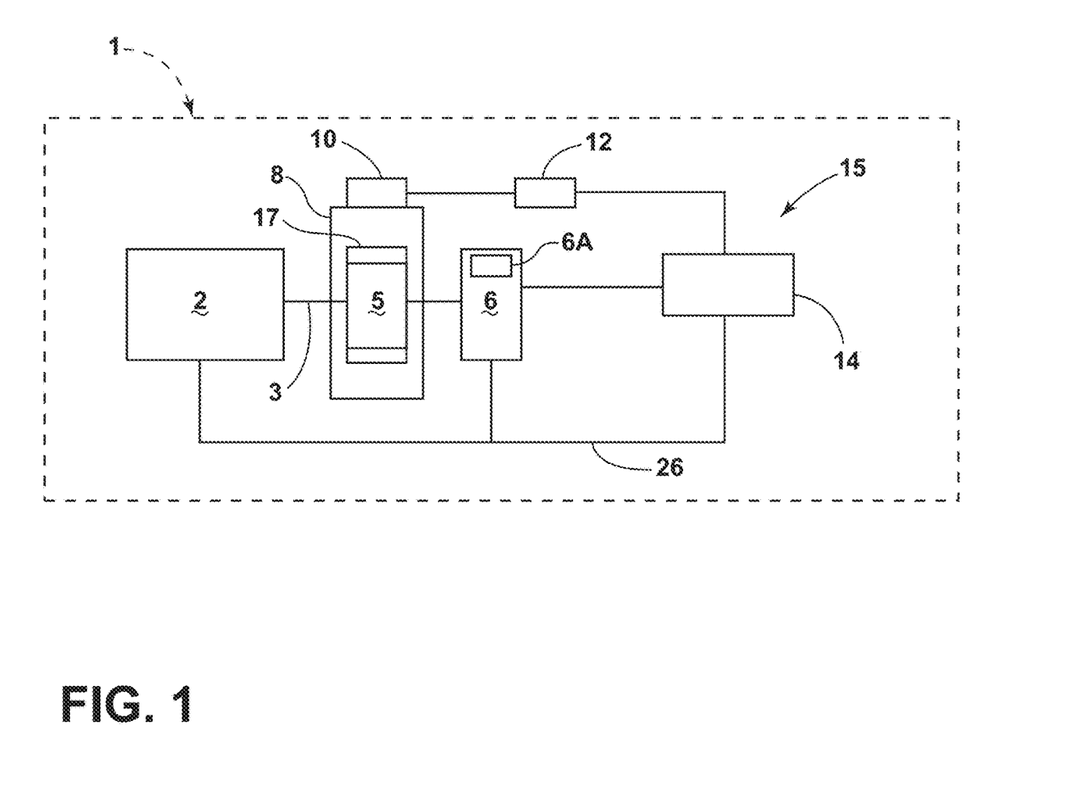
FIG. 1 is a block diagram of a motor vehicle including an engine torque measurement system according to one aspect of the present disclosure.

For purposes of description herein, the terms "upper," "lower," "right," "left," "rear," "front," "vertical," "horizontal," and derivatives thereof shall relate to the invention as oriented in FIG. 1. However, it is to be understood that the disclosure may assume various alternative orientations and step sequences, except where expressly specified to the contrary. It is also to be understood that the specific devices and processes illustrated in the attached drawings, and described in the following specification are simply exemplary embodiments of the concepts defined in the appended claims. Hence, specific dimensions and other physical characteristics relating to the embodiments disclosed herein are not to be considered as limiting, unless the claims expressly state otherwise.

With reference to FIG. 1, a motor vehicle 1 includes an engine 2 having a rotating output shaft 3 that mechanically interconnects the engine 2 with a flywheel 5 having a plurality of teeth 17 disposed on a generally circular peripheral portion of the flywheel in a conventional known configuration. Flywheel 5 may be operably connected to a vehicle drivetrain 6 in a known manner. The drivetrain 6 may include a transmission and other components that transfer torque from engine 2 to one or more driven wheels (not shown) of the motor vehicle 1. The engine 2 may comprise an internal combustion engine or a hybrid power source including internal combustion components and electrical drive components.

Vehicle 1 includes an engine torque sensor system 15 that includes a flywheel speed sensor 10, a counter-timer 12, and a controller 14. The flywheel speed sensor 10 may comprise a magnetic inductive sensor that is mounted on a flywheel housing 8 to sense teeth 17 of flywheel 5 as the teeth 17 move past the flywheel speed sensor 10. Rotation of flywheel 5 causes teeth 17 to move past flywheel speed sensor 10, thereby inducing voltage pulses (amplitude peaks) that are detected by flywheel speed sensor 10. As discussed in more detail below in connection with FIG. 3, the counter-timer 12 precisely counts (measures) the time in between each pulse Pn. This time corresponds to the time that elapses between each tooth passing by sensor 10.

As shown in FIG. 1, the counter-timer 12 is operably connected to a computing device such as controller 14. The controller 14 is configured to log (i.e. store in memory) an array of tooth passing times in and computes an angular acceleration of the flywheel 5 at a firing frequency of the engine 2. The computing device or controller 14 then provides the amplitude of the angular acceleration of the flywheel 5 to one or more control units 6A of the drivetrain 6 or other vehicle components. The controller 14 and/or other control units 6A, etc. may utilize the amplitude of the angular acceleration of the flywheel 5 as an indicator of the engine torque. Controller 14 may be configured to determine (i.e. calculate) the engine output torque based on the angular acceleration of the flywheel 5, independent of the overall dynamics of motor vehicle 1. It will be understood that although the controller 14 is represented schematically in FIG. 1, controller 14 may include one or more circuits, processing units and/or individual controllers for various vehicle components.

Figure 2:
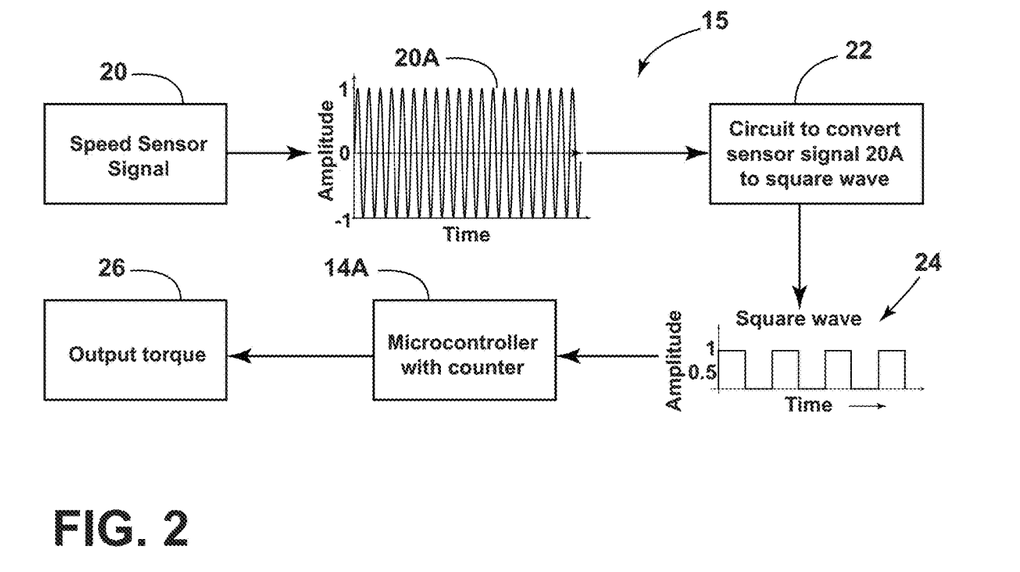
FIG. 2 is a flowchart showing operation of the system.

Operation of engine torque sensing system 15 is shown schematically in FIG. 2. In use, the flywheel speed sensor 10 produces a speed sensor signal 20 in the form of an amplitude vs time wave 20A (see also FIG. 3). The speed sensor signal 20A may be converted to a square wave 24 by a circuit 22 or other suitable component. The square wave 24 is provided to a microcontroller 14A that includes a counter-timer. The microcontroller 14A may be configured to provide an output torque 26 to one or more vehicle components such as control unit 6A of drivetrain 6.

The speed sensor signal (line 20B, FIG. 3) is generally (approximately) in the form of a sinusoidal wave having a frequency defined by the product of the rotational speed of the flywheel 5 and the number of teeth 17 on the flywheel starter gear. The frequency of the sinusoidal wave can be determined by counting the time between the pulses when the voltage crosses zero (i.e. horizontal line 28) on a positive slope (e.g. at points 30 and 30A). The time between pulses corresponds to the time between two consecutive teeth members 17 of flywheel 5 passing flywheel speed sensor 10. The counter-timer 12 may be configured to generate an N point array of individual pulse time periods in, which comprise one full rotation of the flywheel. The N point array can be stored in controller 14. N is the number of flywheel teeth, which typically is in a range of 100 to 200 teeth. The controller 14 divides the angle (in radians) between the teeth 17, which is determined by the formula 2n/N, wherein N is the number of teeth, by the individual pulse time periods in to determine the "instantaneous" flywheel speed in radians per second to form an array of instantaneous speeds (It will be understood that the "instantaneous" flywheel speeds are actually the average speeds between each pair of adjacent flywheel teeth). FIG. 4 is a graph showing an example of instantaneous flywheel speed measured utilizing this approach.

Figure 3:
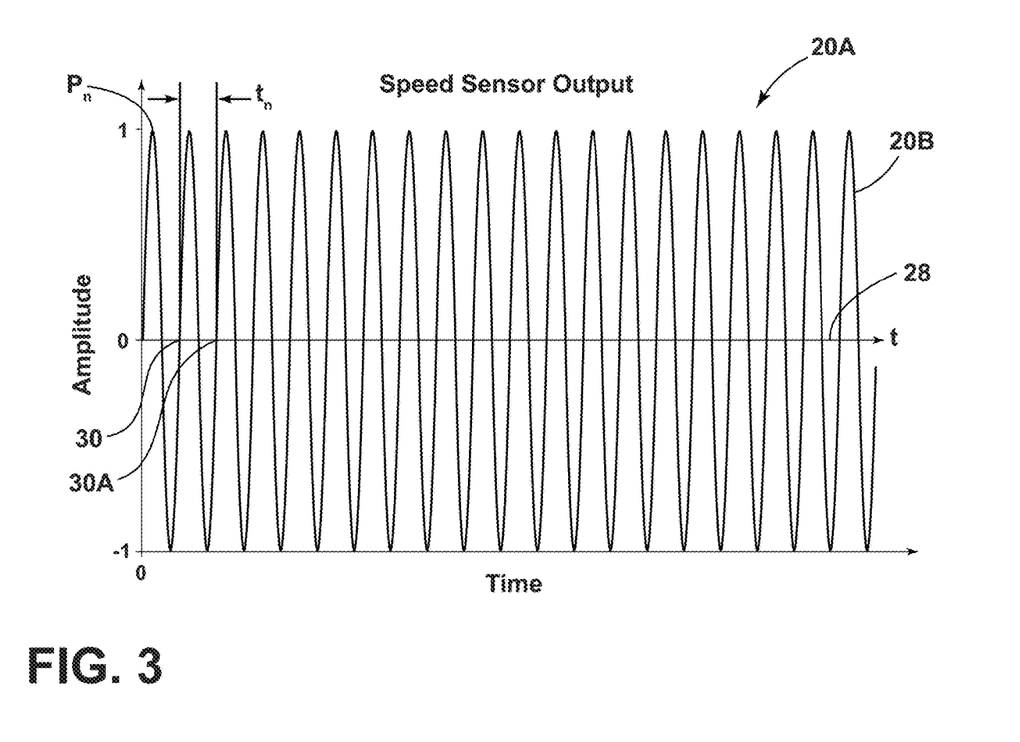
FIG. 3 is a graph of a time history of the output of the flywheel speed sensor.
Figure 4:
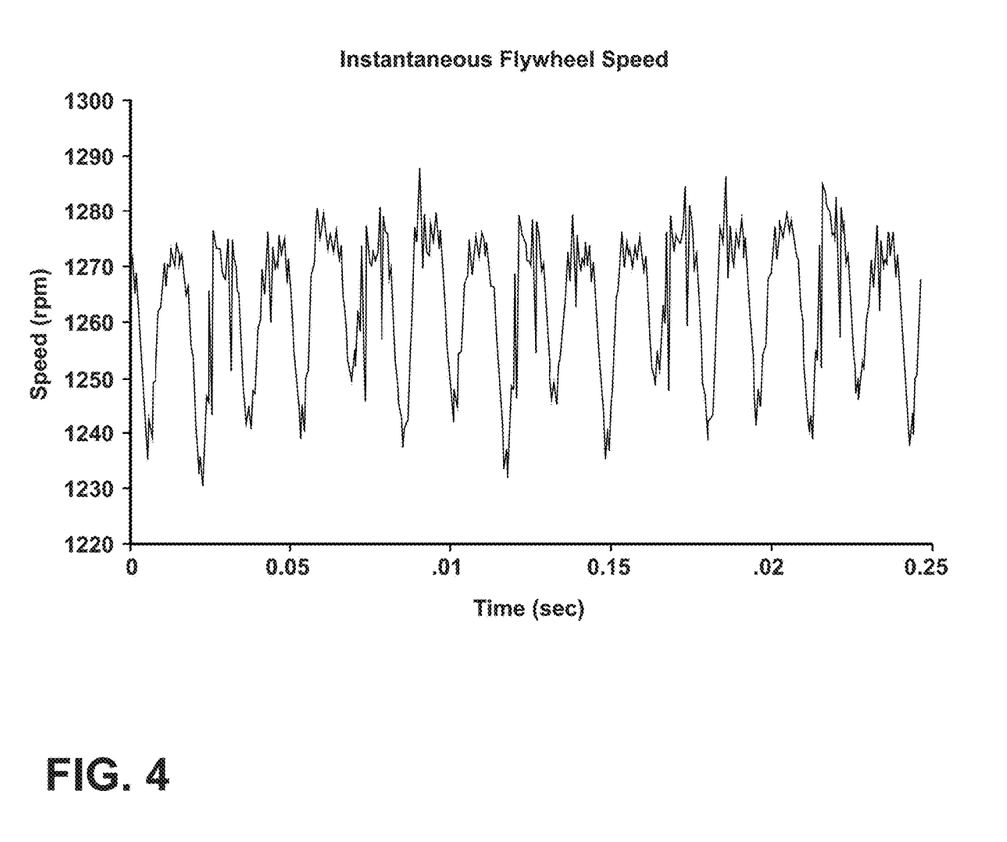
FIG. 4 is a graph of a time history of the instantaneous flywheel speed.
Figure 5:
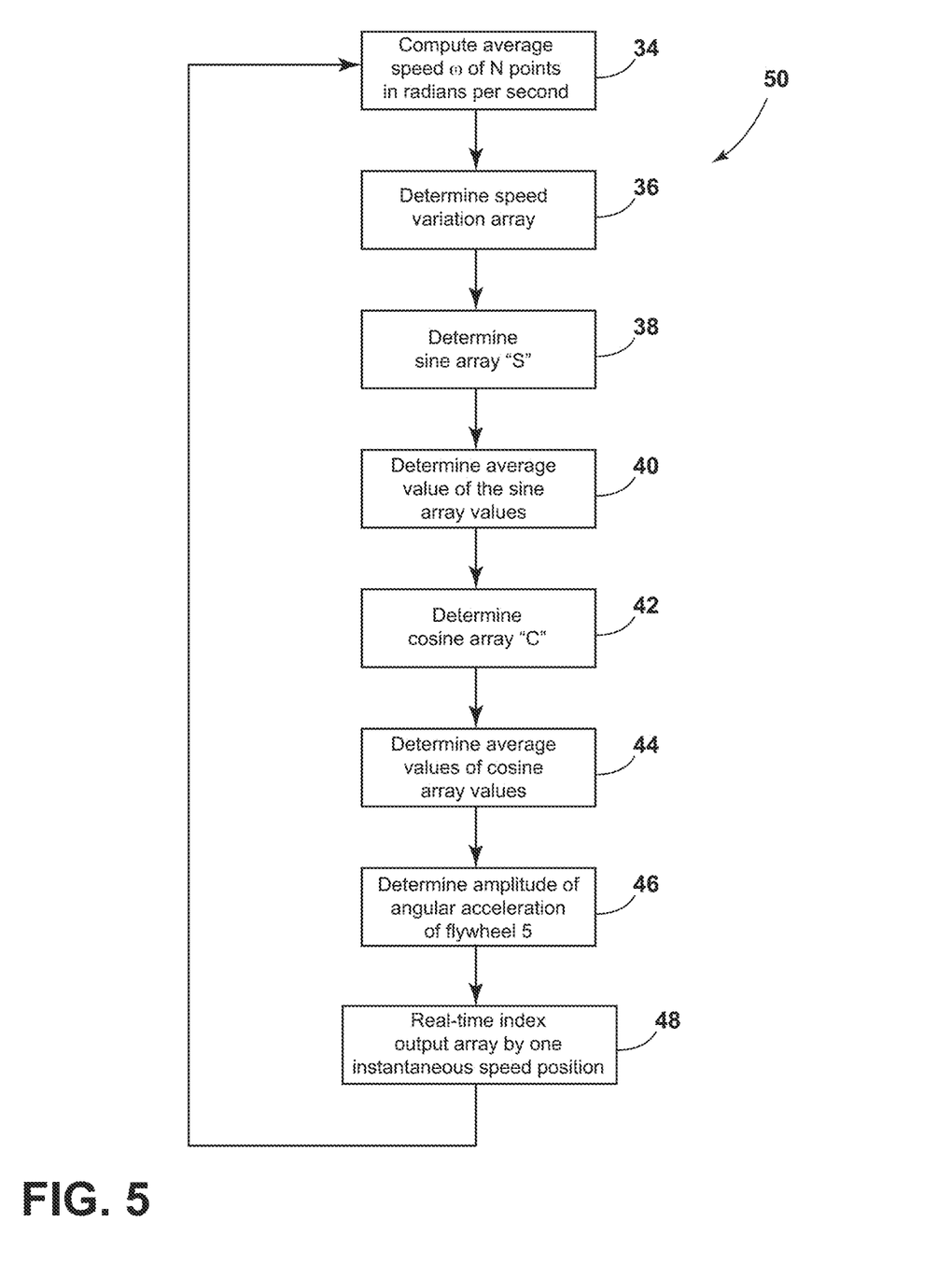
FIG. 5 is a flowchart showing a process for determining engine torque.
Figure 7:
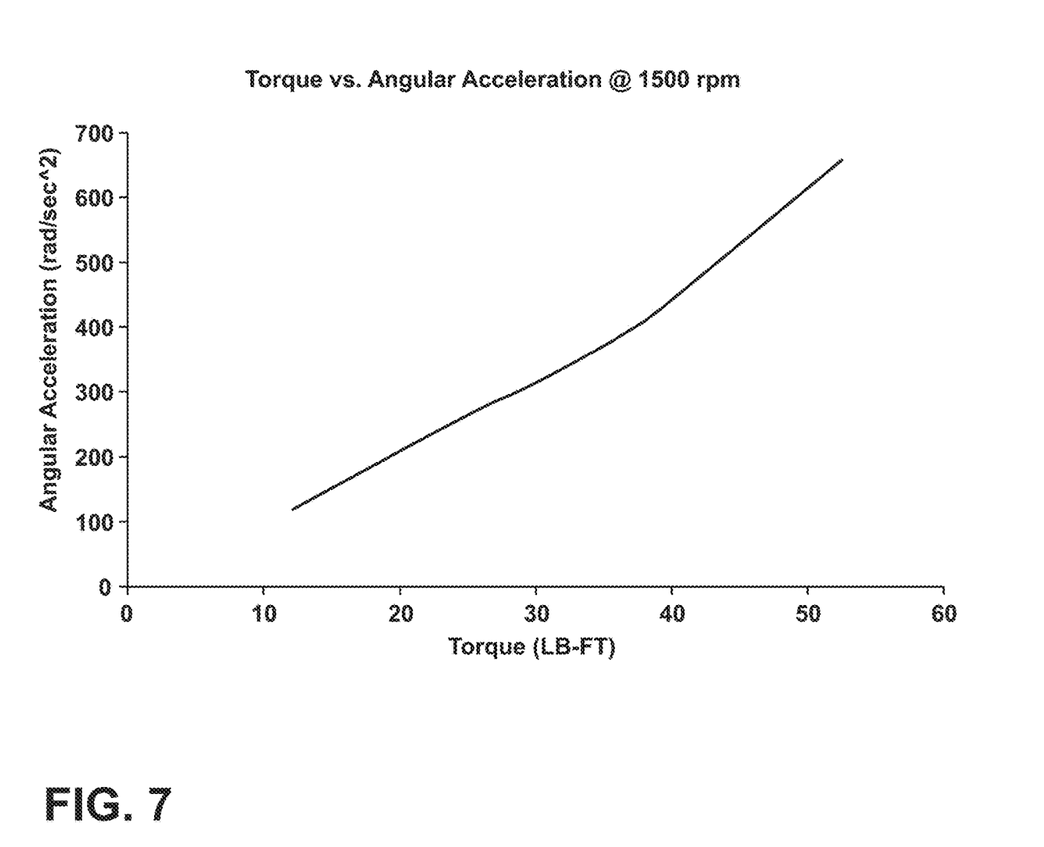
FIG. 7 is a graph showing Torque vs Angular Acceleration at 1500 rpm.

In use, the computational device (e.g. controller 14) stores the array of instantaneous speeds of FIG. 3. The array of instantaneous speeds may be stored in "square wave" form. However, it is possible to store and retrieve the information in any suitable format. After accumulation of N points, the computational device of controller 14 then implements a process 50 (FIG. 5). As discussed below in connection with FIG. 5, algorithm or process 50 uses a Fourier transform to filter the time history of the wideband flywheel speed variation signal and determine the amount of speed variation at the engine firing frequency, from which it calculates the acceleration at the firing frequency. The value of the acceleration can then be directly related to the engine torque as shown in FIG. 7.

First, at step 34, the computational device computes the average speed of the N points in radians per second, which may be represented as w.

At step 36, the computational device then determines a speed variation array. The speed variation array is determined by subtracting the average speed from the numerical value of the instantaneous speed associated with each point in the array.

At step 38, the computational device then calculates a sine array (designated "S" below) by multiplying the value of each point (number) in the speed variation array by the quantity defined by the formula sine 2Fπn/N, where n corresponds to the sequential number of that point in the speed variation array, from 1 to N. This is equivalent to multiplying each value of the speed variation array by a sine wave of a frequency that has F cycles over the length of the speed variation array. F is the number of cylinder firings per crankshaft revolution. For a four cycle engine, the number of cylinder firings F per crank shaft revolution is one-half the number of cylinders. For a two cycle engine, the number of cylinder firings F per crank shaft revolution is equal to the number of cylinders. The purpose of step 38 is to determine the in-phase Fourier coefficient or the in-phase amplitude of the angular velocity at the firing frequency.

At step 40, the computational device then averages the values in the sine array S by dividing the sum of the values in the sine array S by the number of values in the sine array S.

At step 42, the computational device then multiplies the value at each point in the speed variation array by the quantity defined by the formula cosine (2Fπn/N) where n corresponds to the sequential number of that point in the speed variation array, from 1 to N. This is equivalent to multiplying the speed variation array by a cosine wave of a frequency that has F cycles over the length of the speed variation array. This is called the cosine array (designated "C" below).

At step 44, the computational device then averages the values in the cosine array C by dividing the sum of the values in the cosine array C by the number of values in the cosine array C.

At step 46, the computational device then calculates the amplitude (A) of the angular acceleration $A_n$ of the flywheel 5 at the firing frequency F over one revolution of the flywheel.

$$A_n = 2*F*\omega*\sqrt[2]{S_n^2 + C_n^2} \qquad 1.0$$

The value $A_n$ for the angular acceleration for one revolution of the flywheel is stored and transmitted to a receiving bus (not shown) or other component of controller 14.

At step 48, a new array is generated during the next revolution of the flywheel and the calculation is then repeated, starting at step 34. Steps 34-48 are repeated to provide another output array of the results of the sequential calculation of the amplitude $A_n$ of the angular acceleration of flywheel 5.

Figure 6:
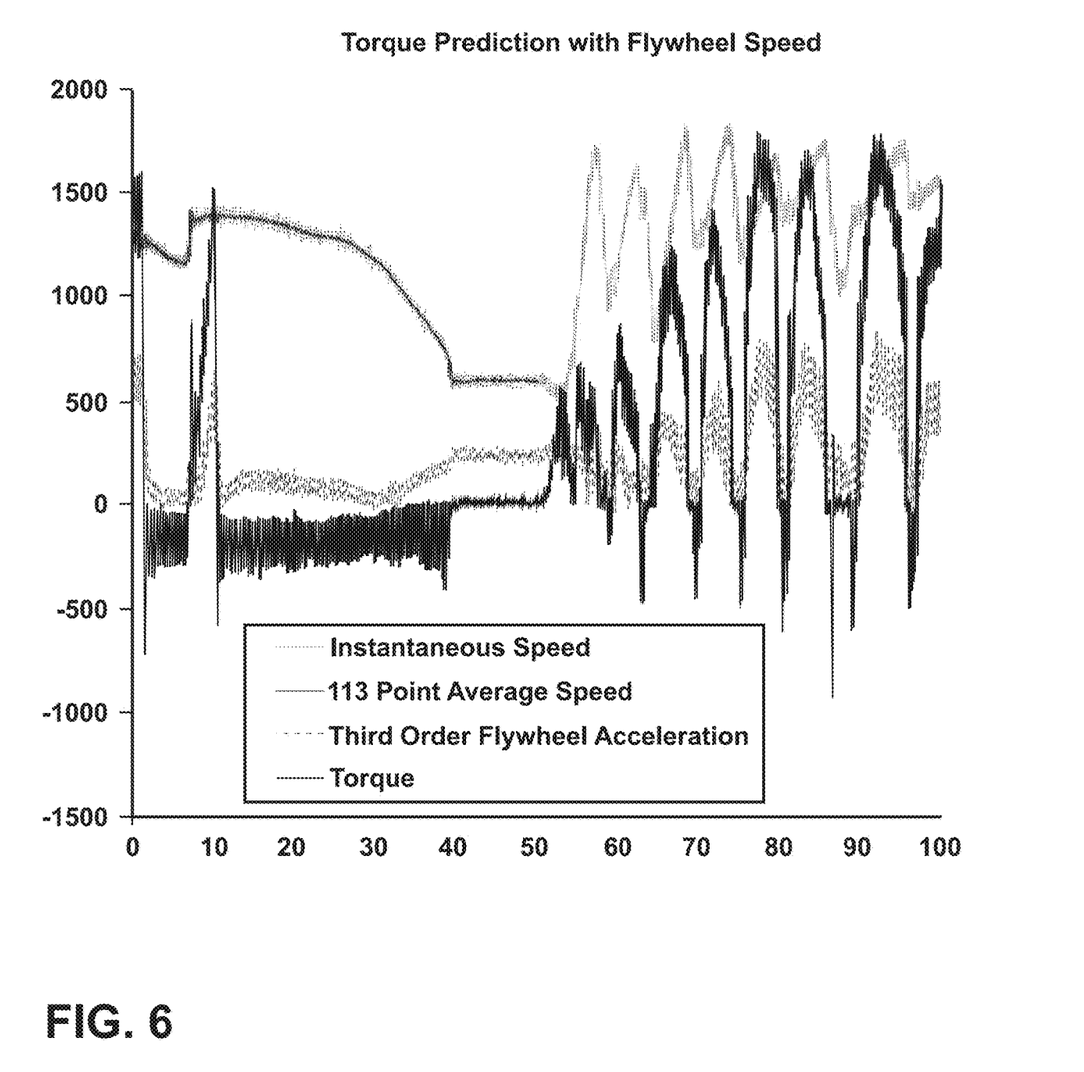
FIG. 6 is a plot of measured angular acceleration of a flywheel at engine firing frequency vs. measured engine torque at the flywheel.

FIG. 6 is a graph showing the time history of the Fourier coefficient of the amplitude $A_n$ of the flywheel angular acceleration at the firing frequency F of the engine 2 vs. measured torque at the flywheel.

If a higher degree of accuracy is required, the process of FIG. 5 can be duplicated in parallel for the higher harmonics of firing frequency, using 2F, 3F, 4F, etc. until the desired accuracy is achieved. The total amplitude of the angular acceleration of the flywheel at the firing frequency for multiple harmonics can be computed by the equation 2.0:

$$A_T = \sqrt[2]{A_1^2 + A_2^2 \ldots + A_x^2} \qquad 2.0$$

Where x is the number of desired harmonics.

The angular accelerations $A_n$ of the flywheel can be used to determine engine torque utilizing a factor related to the inertia and speed of the flywheel. Specifically, with reference to FIG. 7, the torque vs angular acceleration for a given engine rpm can be determined analytically (or empirically), and the controller 14 can be configured (programmed) to calculate engine torque based on rpm and angular acceleration.

The invention claimed is:

1. A system for measuring engine torque in a motor vehicle having an engine that transfers torque through a flywheel to a drivetrain of the vehicle, the system comprising:
   a drivetrain including a transmission, a flywheel, and a drivetrain control unit;
   a sensor that is configured to detect gear teeth of the flywheel moving past the sensor to provide a sequence of pulses comprising amplitude peaks which occur due to the gear teeth moving past the sensor, wherein sequentially adjacent pulses define pulse times therebetween;
   a computational device operably connected to the drivetrain control unit, wherein the computational device is configured to:
   a) determine N discreet flywheel speeds by dividing an angular distance between adjacent teeth by the pulse times;
   b) determine an average flywheel speed ω for the N discreet flywheel speeds;
   c) determine a speed variation array by determining a difference between each discreet flywheel speed and the average flywheel speed ω;
   d) determine a sine array by multiplying each value of the speed variation array by sine (2Fπn/N) wherein n corresponds to a sequential number of each value of the speed variation array and F is the number of cylinder firings per crankshaft revolution;
   e) determine an average of the values of the sine array;
   f) determine a cosine array by multiplying each value of the speed variation array by cosine (2Fπn/N);
   g) determine an average of the values of the cosine array;
   h) determine an amplitude of an angular acceleration of the flywheel;
   wherein at least one of the computational device and the drivetrain control unit is further configured to determine an engine torque on the flywheel utilizing the angular acceleration of the flywheel;
   and wherein the drivetrain control unit is configured to utilize the engine torque to control shifting of the transmission.

2. The system of claim 1, wherein:
   the computational device is configured to repeat steps a)-h) to determine a plurality of angular accelerations of the flywheel.

3. The system of claim 2, wherein:
   the computational device is configured to determine an amplitude of an angular acceleration by multiplying the square root of the sum of the squares of the average of the sine array and the cosine array by 2Fπω).

4. The system of claim 3, including:
   duplicating steps a)-h) for at least one higher harmonic 2F of the firing frequency.

5. The system of claim 4, wherein:
   the sensor comprises a magnetic inductive device.

6. The system of claim 5, wherein:
   the magnetic inductive device is configured such that an output of the magnetic inductive device comprises sinusoidal waves when the gear teeth of the flywheel move past the magnetic inductive device.

7. The system of claim 6, wherein:
the computational device is configured to provide the amplitude of the angular acceleration of the flywheel to the drivetrain control unit.

8. A method of controlling a transmission of a vehicle, the method comprising:
utilizing a sensor to detect gear teeth of a drivetrain flywheel moving past the sensor, the sensor providing an output signal having a plurality of pulses comprising amplitude peaks and pulse times between adjacent amplitude peaks;
utilizing one or more computational devices to:
a) determine N discreet flywheel speeds by dividing an angular distance between adjacent teeth by the pulse times;
b) determine an average flywheel speed co for the N discreet flywheel speeds;
c) determine a speed variation array by determining a difference between each discreet flywheel speed and the average flywheel speed w;
d) determine a sine array by multiplying each value of the speed variation array by sine (2Fπn/N) wherein n corresponds to a sequential number of each value of the speed variation array and F is the number of cylinder firings per crankshaft revolution;
e) determine an average of the values of the sine array;
f) determine a cosine array by multiplying each value of the speed variation array by cosine (2Fπn/N);
g) determine an average of the values of the cosine array;
h) determine an amplitude of an angular acceleration of the flywheel;
i) determining an engine torque on the flywheel utilizing the angular acceleration of the flywheel and a predefined relationship between torque and angular acceleration; and
j) controlling at least one of shifts and actuations of the transmission based, at least in part, on the engine torque on the flywheel, without controlling air or fuel intake of an internal combustion engine.

9. The method of claim 8, wherein:
the one or more computational devices are configured to repeat steps a)-h) to determine a plurality of angular accelerations of the flywheel.

10. The method of claim 9, wherein:
the one or more computation devices are configured to determine an amplitude of an angular acceleration by multiplying the square root of the sum of the squares of the average of sine array and the cosine array by 2Fω.

11. The method of claim 10, wherein:
the one or more computational devices are configured to duplicate steps a)-h) for at least one higher harmonic 2F of a firing frequency.

12. The method of claim 11, wherein:
the sensor comprises a magnetic inductive device.

13. The method of claim 12, wherein:
the output of the magnetic inductive device comprises a plurality of sinusoidal waves when the gear teeth of the flywheel move past the magnetic inductive device.

14. The method of claim 13, wherein:
the computational device is configured to provide the amplitude of the angular acceleration of the flywheel to a controller associated with a vehicle driveline component.

15. A method of measuring engine torque to control a vehicle drivetrain that includes a flywheel, the method comprising:
utilizing a sensor to generate measured pulses corresponding to individual gear teeth of the flywheel moving past the sensor;
utilizing output from the sensor to determine pulse times between measured pulses corresponding to adjacent gear teeth;
determining a plurality of individual angular speeds by dividing angles between selected gear teeth by pulse times corresponding to the selected gear teeth;
determining an average flywheel speed ω;
utilizing differences between the average flywheel speed co and the individual speeds between gear teeth to determine an angular acceleration of the flywheel;
determining an engine torque on the flywheel utilizing the angular acceleration of the flywheel; and
providing the engine torque to a controller that is configured to control a vehicle drivetrain.

16. The method of claim 15, wherein:
the plurality of individual angular speeds comprises N discrete flywheel speeds; and including:
determining a speed variation array by determining a difference between each individual speed and the average flywheel speed ω;
determining a sine array by multiplying each value of the speed variation array by sine (2Fπn/N) wherein n corresponds to a sequential number of each value of the speed variation array and F is the number of cylinder firings per crankshaft revolution.

17. The method of claim 16, including:
determining a cosine array by multiplying each value of the speed variation array by cosine (2Fπn/N).

18. The method of claim 17, including:
determining an average of the values of the cosine array.

19. The method of claim 18, including:
determining a plurality of angular accelerations of the flywheel, wherein each angular acceleration corresponds to one revolution of the flywheel.

20. The method of claim 19, wherein:
the sensor is mounted to a motor vehicle; and
a computational device is utilized to determine the engine torque utilizing data from the sensor.

\* \* \* \* \*

UNITED STATES PATENT AND TRADEMARK OFFICE
CERTIFICATE OF CORRECTION

PATENT NO. : 11,585,709 B2
APPLICATION NO. : 16/807553
DATED : February 21, 2023
INVENTOR(S) : Ghantasala et al.

It is certified that error appears in the above-identified patent and that said Letters Patent is hereby corrected as shown below:

In the Specification

Column 1, Line 57, "w" should be --ω--;

Column 1, Line 60, "w" should be --ω--;

Column 2, Line 14, "d Sc osure" should be --disclosure--;

Column 2, Line 17, "pukes" should be --pulses--;

Column 2, Line 18, "puke" should be --pulse--;

Column 2, Line 21, "puke" should be --pulse--;

Column 2, Line 22, "w" should be --ω--;

Column 2, Line 25, "w" should be --ω--;

Column 3, Line 59, "in" should be --τn--;

Column 4, Line 29, "in" should be --τn--;

Column 4, Line 34, "2n/N" should be --2π/N--;

Column 4, Line 35, "in" should be --τn--;

Column 4, Line 59, "w" should be --ω--;

Column 6, Line 57, "2Fπω)" should be --2Fπω--;

Signed and Sealed this
Twenty-fifth Day of April, 2023

Katherine Kelly Vidal
*Director of the United States Patent and Trademark Office*

In the Claims

Column 7, Line 16, Claim 8, "co" should be --ω--;

Column 7, Line 20, Claim 8, "w" should be --ω--;

Column 8, Line 24, Claim 15, "co" should be --ω--.